(12) United States Patent
Mineta et al.

(10) Patent No.: US 11,892,392 B2
(45) Date of Patent: Feb. 6, 2024

(54) CORROSION RATE ESTIMATING DEVICE AND METHOD

(71) Applicant: Nippon Telegraph and Telephone Corporation, Tokyo (JP)

(72) Inventors: Shingo Mineta, Musashino (JP); Shota Oki, Musashino (JP); Mamoru Mizunuma, Musashino (JP); Soichi Oka, Musashino (JP); Takashi Sawada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 625 days.

(21) Appl. No.: 17/058,098

(22) PCT Filed: May 24, 2019

(86) PCT No.: PCT/JP2019/020575
§ 371 (c)(1),
(2) Date: Nov. 23, 2020

(87) PCT Pub. No.: WO2019/225727
PCT Pub. Date: Nov. 28, 2019

(65) Prior Publication Data
US 2021/0215594 A1 Jul. 15, 2021

(30) Foreign Application Priority Data
May 24, 2018 (JP) .................................. 2018-099495

(51) Int. Cl.
*G01N 17/04* (2006.01)
*G06N 20/00* (2019.01)
*G06N 5/04* (2023.01)

(52) U.S. Cl.
CPC ............... *G01N 17/04* (2013.01); *G06N 5/04* (2013.01); *G06N 20/00* (2019.01)

(58) Field of Classification Search
None
See application file for complete search history.

(56) References Cited

U.S. PATENT DOCUMENTS

| 9,239,282 B2* | 1/2016 | Miyazaki ................ F22B 37/38 |
| 2010/0238027 A1* | 9/2010 | Bastianini ................ H04Q 9/00 |
| | | 702/34 |

(Continued)

FOREIGN PATENT DOCUMENTS

| JP | H10-21211 A | 1/1998 |
| JP | 2012-251846 A | 12/2012 |

OTHER PUBLICATIONS

International Search Report dated Aug. 27, 2019, issued in PCT Application No. PCT/JP2019/020575, filed May 24, 2019.

(Continued)

*Primary Examiner* — Lina Cordero
(74) *Attorney, Agent, or Firm* — Workman Nydegger

(57) ABSTRACT

A corrosion rate estimation apparatus includes a corrosion rate measurement unit adapted to repeat water supply cycles in which water is supplied to soil in which metal to be evaluated is buried and measure a cycle number of each water supply cycle, one or more time points in each cycle, and a corrosion rate of the metal at the time point(s); a learning unit adapted to find a prediction model by accepting the cycle number, the time point(s) in the cycle, and the corrosion rate(s) as input and using a machine learning algorithm, the prediction model representing a future corrosion rate; and a corrosion rate estimation unit adapted to assign a cycle number and a time point in the cycle at which a corrosion rate is desired to be estimated to the prediction (Continued)

model and estimate a corrosion rate of the metal at the time point.

3 Claims, 13 Drawing Sheets

(56) References Cited

U.S. PATENT DOCUMENTS

| | | | | |
|---|---|---|---|---|
| 2015/0204775 A1* | 7/2015 | Shukla | ............... | G01N 17/04 |
| | | | | 702/57 |
| 2018/0024042 A1* | 1/2018 | Ulmer | ............... | G01N 17/04 |
| | | | | 324/700 |
| 2019/0094124 A1* | 3/2019 | Amer | ............... | G01K 1/045 |

OTHER PUBLICATIONS

Giichi Miyata et al., *Corrosion Monitoring of Metals in Soils by Electrochemical and Related Methods: Part II*, Materials and the Environment, vol. 46, No. 10, 1997, pp. 610-619.

Shingo Mineda et al., *Corrosion Behavior of Steel in Soil with Repeated Changes in Water Content*, 2018 Lectures on Materials and the Environment, Apr. 27, 2018, pp. 111-112.

* cited by examiner

Fig. 7 (a)

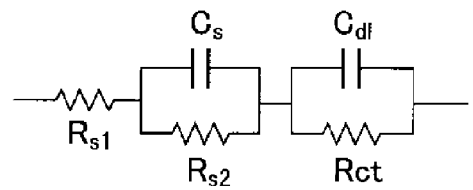

$R_{s1}$, $R_{s2}$: RESISTANCE COMPONENTS IN SOIL AND OTHER RESISTANCE COMPONENTS
$R_{ct}$: CHARGE TRANSFER RESISTANCE
$C_{dl}$: ELECTRICAL DOUBLE LAYER CAPACITANCE
$C_s$: CAPACITANCE COMPONENT IN SOIL

Fig. 7(b)

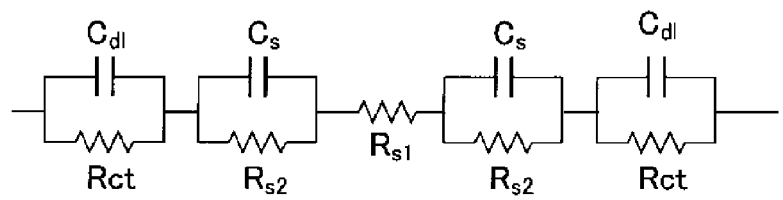

$R_{s1}$, $R_{s2}$: RESISTANCE COMPONENTS IN SOIL AND OTHER RESISTANCE COMPONENTS
$R_{ct}$: CHARGE TRANSFER RESISTANCE
$C_{dl}$: ELECTRICAL DOUBLE LAYER CAPACITANCE
$C_s$: CAPACITANCE COMPONENT IN SOIL

Fig. 8(a)

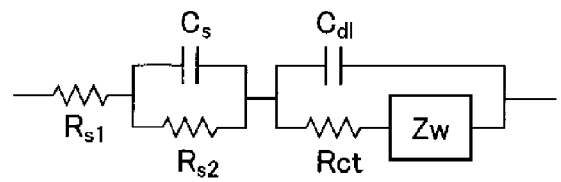

$R_{s1}$, $R_{s2}$: RESISTANCE COMPONENTS IN SOIL AND OTHER RESISTANCE COMPONENTS
$R_{ct}$: CHARGE TRANSFER RESISTANCE
$C_{dl}$: ELECTRICAL DOUBLE LAYER CAPACITANCE
$C_s$: CAPACITANCE COMPONENT IN SOIL
$Z_w$: WARBURG IMPEDANCE

Fig. 8(b)

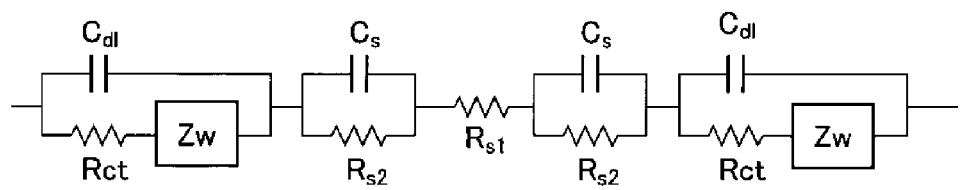

$R_{s1}$, $R_{s2}$: RESISTANCE COMPONENTS IN SOIL AND OTHER RESISTANCE COMPONENTS
$R_{ct}$: CHARGE TRANSFER RESISTANCE
$C_{dl}$: ELECTRICAL DOUBLE LAYER CAPACITANCE
$C_s$: CAPACITANCE COMPONENT IN SOIL
$Z_w$: WARBURG IMPEDANCE

CORROSION RATE ESTIMATING DEVICE AND METHOD

TECHNICAL FIELD

The present invention relates to a corrosion rate estimation apparatus and corrosion rate estimation method that estimate a corrosion rate of metal buried underground.

BACKGROUND ART

Much of infrastructure equipment, which was constructed intensively in the high economic growth period, will age all at once in the future. On the other hand, costs able to be spent on maintenance and management of equipment and personnel involved in maintenance are on the decrease. Therefore, there is a fear that the infrastructure equipment cannot be maintained and managed appropriately in the future and it might become difficult to maintain security and safety. To deal with such an aging problem of infrastructure equipment, recently, there have been attempts to predict progress of equipment aging and work out an effective maintenance plan based on results of the prediction.

Methods for predicting deterioration of infrastructure equipment include a statistical technique. The statistical technique is a method that involves observing and analyzing samples deteriorated through exposure to diverse natural environments and deriving a predictive equation through statistical analysis such as regression analysis and extreme value statistics based on resulting data.

Also, there is a method for experimentally finding a predictive equation. There has been proposed an idea of burying a metal in an environment that simulates soil of interest and measuring metal corrosion in the soil using an electrochemical technique (e.g., Non-Patent Literature 1).

CITATION LIST

Non-Patent Literature

Non-Patent Literature 1: Yoshikazu Miyata, et al., "Corrosion Monitoring of Metals in Soils by Electrochemical and Related Methods: Part 2," Zairyo-to-Kankyo, 1997, Vol. 46, pp. 610-619

SUMMARY OF THE INVENTION

Technical Problem

However, the conventional statistical technique has a problem in that it is originally difficult to collect information necessary for statistical analysis or it is necessary to spend a great deal of cost and time. Also, to find a corrosion rate function that represents a corrosion rate by experimentally measuring metal corrosion in soil, a long period is required for experiments. That is, the method for experimentally finding a corrosion amount also has a problem in that cost and time are required.

The present invention has been made in view of the above problems and has an object to provide a corrosion rate estimation apparatus and corrosion rate estimation method that can easily and simply predict a corrosion rate of metal in a short time after the metal has been buried in soil for any period of time.

Means for Solving the Problem

According to one aspect of the present embodiment, there is provided a corrosion rate estimation apparatus comprising: a corrosion rate measurement unit adapted to repeat water supply cycles in which water is supplied to soil in which metal to be evaluated is buried and measure a cycle number of each water supply cycle, one or more time points in each cycle, and a corrosion rate of the metal at the time point(s); a learning unit adapted to find a prediction model using the cycle number, the time point(s), and the corrosion rate(s) as input and using a machine learning algorithm, the prediction model representing a future corrosion rate; and a corrosion rate estimation unit adapted to assign a cycle number and a time point in the cycle at which a corrosion rate is desired to be estimated to the prediction model and estimate a corrosion rate of the metal at the time point.

According to another aspect of the present embodiment, there is provided a corrosion rate estimation method performed by the corrosion rate estimation apparatus, the method comprising: repeating water supply cycles in which water is supplied to soil in which metal to be evaluated is buried and measuring a corrosion rate of the metal in each water supply cycle a plurality of times; finding a prediction model by accepting as input cycle numbers of a plurality of the water supply cycles and corrosion rates and using a machine learning algorithm, the prediction model representing a future corrosion rate; and assigning a cycle number and a time point in the cycle at which a corrosion rate is desired to be estimated to the prediction model and estimating a corrosion rate of the metal at the time point.

Effects of the Invention

The present invention makes it possible to easily and simply predict a corrosion rate of metal in a short time after the metal has been buried in soil for any period of time.

BRIEF DESCRIPTION OF DRAWINGS

FIGS. 7(a) and 7(b) are diagrams showing an example of equivalent circuits assumed in calculating charge transfer resistance.

FIGS. 8(a) and 8(b) are diagrams showing an example of equivalent circuits assumed in calculating charge transfer resistance.

DESCRIPTION OF EMBODIMENTS

Embodiments of the present invention will be described below with reference to the drawings. In plural drawings, the same components are denoted by the same reference signs and redundant description thereof will be omitted.

First Embodiment

Figure 1:
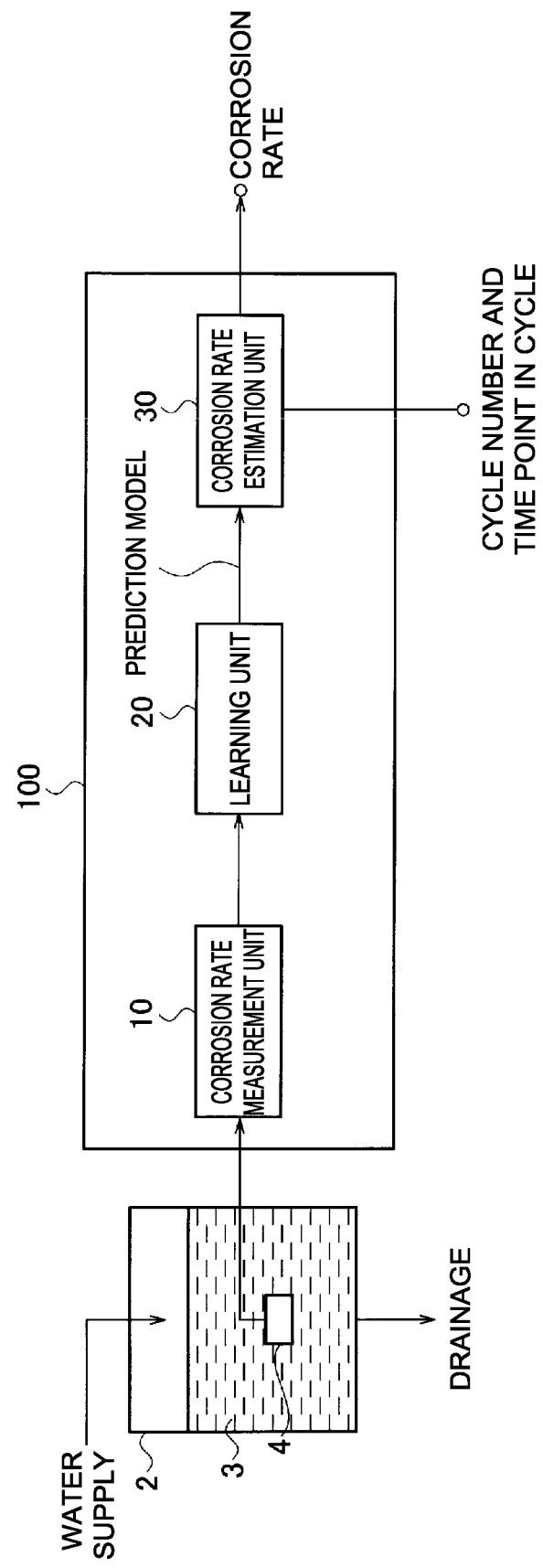
FIG. 1 is a diagram showing a functional configuration example of a corrosion rate estimation apparatus according to a first embodiment of the present invention.

FIG. 1 is a diagram showing a functional configuration example of a corrosion rate estimation apparatus according to a first embodiment of the present invention. The corrosion rate estimation apparatus 100 shown in FIG. 1 easily and simply estimates a corrosion rate of metal in soil in a short time.

FIG. 1 also shows a container unit 2, soil 3, and a sensor 4. The sensor 4 includes metal to be evaluated and is buried in the soil 3 contained in the container unit 2. The metal to be evaluated is not specifically restricted. The metal to be evaluated is, for example, metal used for steel pipe columns, branch line anchors, and underground steel pipes. Besides, the metal to be evaluated may be typical structural metal such as stainless steel or copper, and is not specifically restricted.

The sensor 4 is configured by placing one metal strip to be evaluated in the case of a three-electrode AC impedance method described later, and two metal strips to be evaluated in the case of a two-electrode AC impedance method, in such a way that the electrode(s) will be electrically insulated.

The container unit 2 is made of a chemically stable material which does not change included ion components of the soil 3 contained therein. Suitably the material of the container unit is plastics such as acrylic or polyvinyl chloride, glass, or ceramics.

The container unit 2 has a water supply function and drainage function. It is sufficient that the water supply function and drainage function allow sufficient water to be supplied to the soil 3 and allow water content in the soil 3 to be reduced with time. Thus, the water may be supplied manually. Also, for drainage, it is sufficient that the container unit 2 has an opening (not shown). Also, for the water supply function, it is sufficient that a pump whose water supply time is settable is provided. Also, an on-off valve adapted to perform on/off control over the drainage may be provided.

The soil 3 is of the same classification type as the soil of interest. The soil may be sampled in the field or soil simulating the soil of interest may be used. Soils may be classified based, for example, on the Soil Classification System of Japan worked out by the Japanese Society of Pedology.

Figure 2:
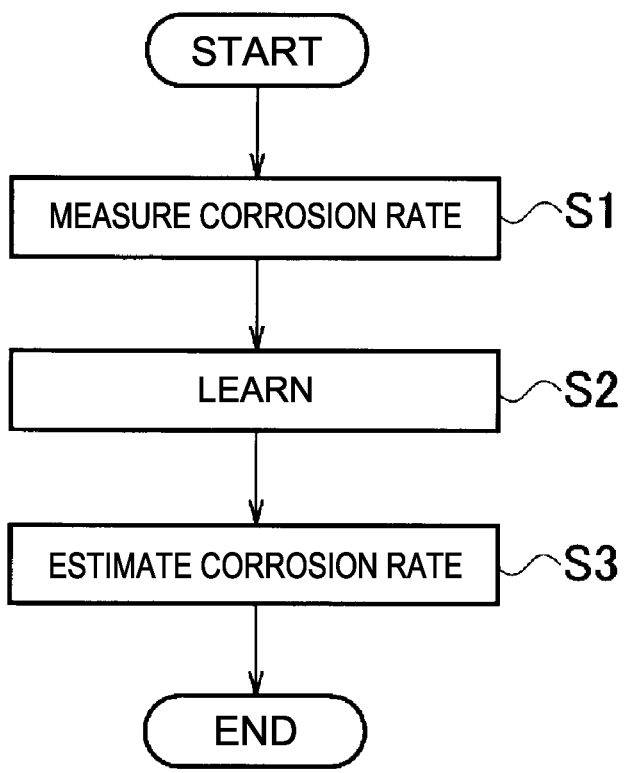
FIG. 2 is a diagram showing an operation flow of the corrosion rate estimation apparatus shown in FIG. 1.

The corrosion rate estimation apparatus 100 includes a corrosion rate measurement unit 10, a learning unit 20, and a corrosion rate estimation unit 30. FIG. 2 is an operation flow showing processing procedures of the corrosion rate estimation apparatus 100. The operation will be described with reference to FIGS. 1 and 2.

The corrosion rate measurement unit 10 repeats water supply cycles in which water is supplied to soil in which the sensor 4 containing metal to be evaluated is buried and measure a cycle number of each water supply cycle, one or more time points in each cycle, and a corrosion rate of the metal in the sensor 4 at the time point(s) (step S1). Details of a method for measuring the corrosion rate of the metal in the sensor 4 will be described later. Hereinafter, the phrase "of the metal in the sensor 4" will be omitted by referring only to the corrosion rate.

The learning unit 20 finds a prediction model by accepting as input the cycle numbers, time points, and corrosion rates measured by the corrosion rate measurement unit 10 and using a machine learning algorithm, where the prediction model represents a future corrosion rate (step S2). Examples of the machine learning algorithm include Random Forests and decision trees. Details of the prediction model and the like will be described later.

The corrosion rate estimation unit 30 assigns a cycle number and a time point in the cycle at which a corrosion rate is desired to be estimated to the prediction model found by the learning unit 20 and estimates the corrosion rate at the time point (step S3).

Because the corrosion rate estimation apparatus 100 according to the present embodiment described above, learns a prediction model that represents a future corrosion rate from the cycle numbers of water supply cycles, time points in the cycles, and corrosion rates at the time points in the cycles and estimates corrosion rates using the prediction model, the corrosion rate of metal in soil can be predicted easily and simply in a short time.

Soil is a mixed three-phase environment made up of soil particles and a gas phase and liquid phase (water) existing among the soil particles where the soil particles are made of oxides of Si, Al, Ti, Fe, Ca and the like. The total sum of the proportions of the gas phase and liquid phase can be regarded to be constant, the two phases being in a reciprocal relationship in which when one of the phases increases, the other decreases. Here, a corrosion reaction of metal in the soil basically requires water and oxygen, and corrosion progresses at a corrosion rate dependent on conditions of water and oxygen. Thus, soil moisture percentage, which means a proportion of water in soil, is an important environmental factor contributing to the corrosion rate, and it can be said that the corrosion rate changes with the soil moisture percentage.

The soil moisture percentage is not always kept constant unless at a position very deep underground. The soil moisture percentage changes, for example, with natural phenomena such as rainfall.

Figure 3:
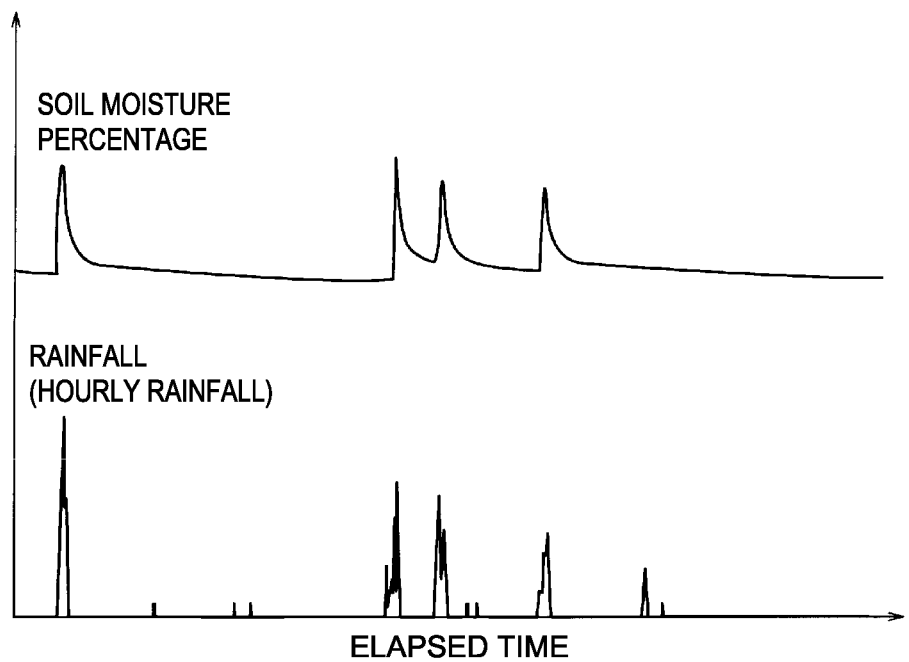
FIG. 3 is a diagram schematically showing a relationship between rainfall and soil moisture percentage.

FIG. 3 is a diagram schematically showing a relationship between rainfall and soil moisture percentage. The abscissa in FIG. 3 represents elapsed time. As shown in FIG. 3, soil moisture percentage increases and decreases in close connection with rainfall, repeating cycles of increasing suddenly during rainfall and decreasing gradually when the rain stops. Thus, it can be considered that changes in corrosion rate over time also repeat cycles beginning with rainfall.

Figure 4:
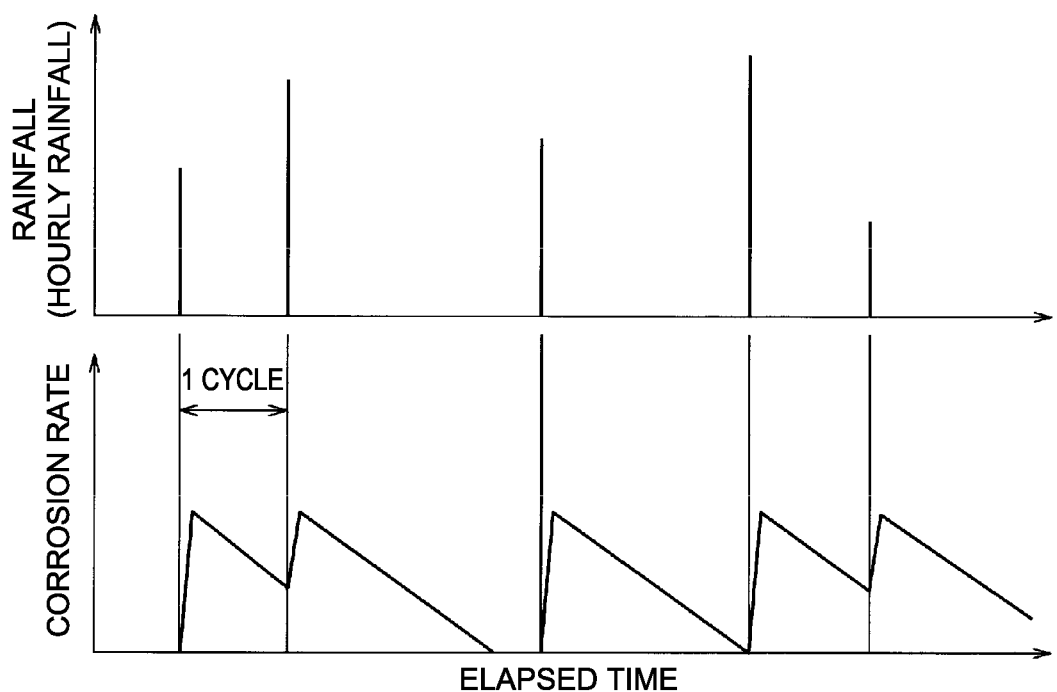
FIG. 4 is a diagram schematically showing a relationship between rainfall and corrosion rate of metal in soil 3.

FIG. 4 is a diagram schematically showing a relationship between rainfall and corrosion rate of metal in the soil 3. The abscissa in FIG. 4 represents elapsed time. Here, one cycle means a period from rainfall to next rainfall, and time length of one cycle varies with the rainfall interval.

Time variation of corrosion rate in one cycle varies with the soil and metal. Also, even with the same combination of soil and metal, the corrosion rate varies depending on the order of a given cycle in the sequence of cycles. For example, in the case of metal such as steel, the corrosion rate in the 10th cycle after burial differs in time variation from the corrosion rate in the 100th cycle. Generally, the corrosion rate decreases with increases in the cycle number.

Figure 5:
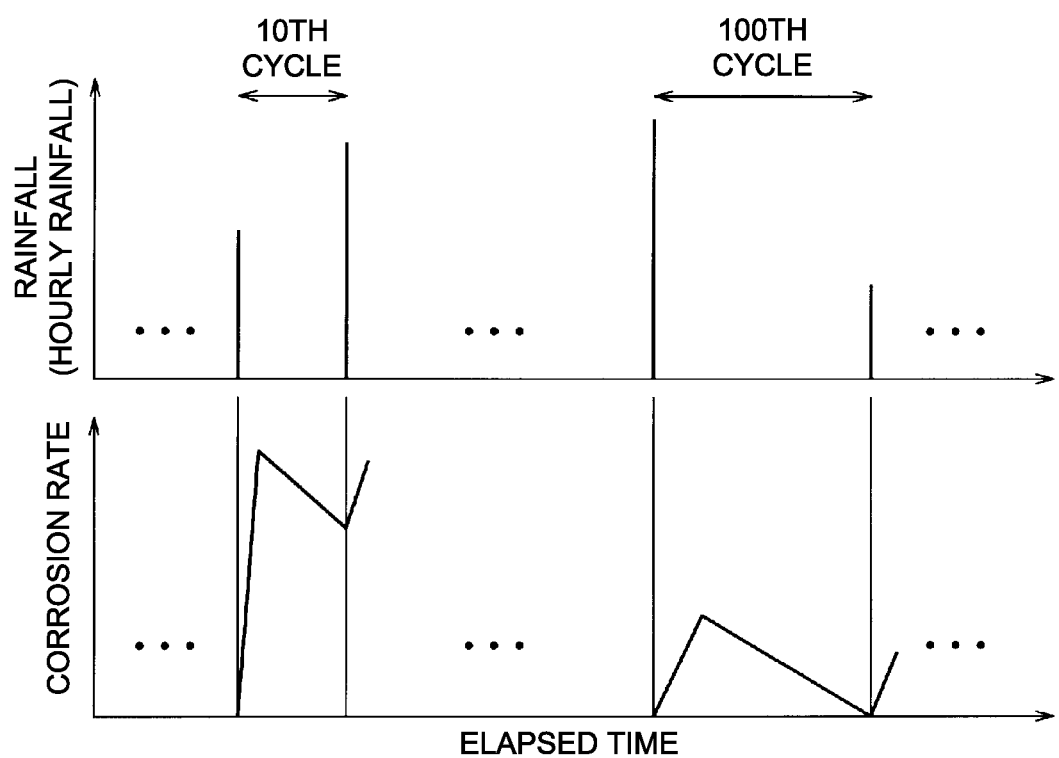
FIG. 5 is a diagram schematically showing how the corrosion rate changes when a cycle number is increased.

FIG. 5 is a diagram schematically showing how the corrosion rate changes when the cycle number is increased. The abscissa in FIG. 5 represents elapsed time.

As shown in FIG. 5, the corrosion rate is generally lower in the 100th cycle than in the 10th cycle. This is because an oxide layer (rust) is formed on surfaces of the metal in soil along with progress of corrosion, suppressing corrosion reaction.

In this way, the area and thickness of the rust covering the metal surfaces increase with increases in the cycle number, resulting in decreases in the corrosion rate. However, the state of rust formed on the metal surfaces varies with the rainfall pattern experienced by the metal. Therefore, for example, between when the frequency of rainfall in a fixed period is high and when the frequency is low, the corrosion rate and corrosion amount vary even if the metal has gone through the same number of cycles.

A corrosion rate estimation method performed by the corrosion rate estimation apparatus 100 according to the present embodiment estimates the corrosion rate of metal in soil with reference to one cycle from rainfall to next rainfall, based on the idea that time variation fn(t) of the corrosion rate in the nth cycle depends on rainfall patterns (combinations of a rainfall interval, amount of rainfall, duration of continuous rainfall, and the like in respective cycles) in the first to (n−1)th cycles experienced by the metal as well as a rainfall interval, amount of rainfall, duration of continuous rainfall, and the like in the nth cycle.

That is, the corrosion rate estimation apparatus 100 according to the present embodiment includes the corrosion rate measurement unit 10 adapted to repeat water supply cycles in which water is supplied to soil in which metal to be evaluated is buried and measure a cycle number of each water supply cycle, one or more time points in each cycle, and a corrosion rate of the metal at the time point(s); the learning unit 20 adapted to find a prediction model by accepting the cycle number, the time point(s) in the cycle, and the corrosion rate(s) as input and using a machine learning algorithm, the prediction model representing a future corrosion rate; and the corrosion rate estimation unit 30 adapted to assign a cycle number and a time point in the cycle at which a corrosion rate is desired to be estimated to the prediction model and estimate a corrosion rate of the metal at the time point. Thus, since the time variations of corrosion rates in plural cycles needed in order to estimate a corrosion rate can be acquired at low cost in a short time, a corrosion rate in any future can be predicted easily and simply in a short time.

Next, functional components of the corrosion rate estimation apparatus 100 will be described in detail.

(Corrosion Rate Measurement Unit)

The corrosion rate measurement unit 10 has an AC impedance measurement function. To measure AC impedance, by using the metal in the sensor 4 as electrodes and applying a weak AC voltage or current between the electrodes, an electrical response is measured. Preferably the voltage or current to be applied is so weak that the surfaces of the metal in the sensor 4 will not change. For example, the voltage is approximately 5 mV. Frequency is varied, for example, in a range of 0.1 Hz to 500 Hz.

By measuring AC impedance, a Nyquist diagram can be obtained. A Nyquist diagram is shown schematically in FIG. 6. The abscissa of the Nyquist diagram represents real part and the ordinate axis represents imaginary part. Using the Nyquist diagram and based on a predetermined equivalent circuit, charge transfer resistance is derived through curve fitting.

FIGS. 7(a), 7(b), 8(a), and 8(b) are examples of equivalent circuits assumed in calculating charge transfer resistance, where FIGS. 7(a) and 8(a) are equivalent circuits measuring AC impedance using three electrodes while FIGS. 7(b) and 8(b) are equivalent circuits measuring AC impedance using two electrodes.

Charge transfer resistance Rct in the figures is resistance of a corrosion reaction of the metal in the sensor 4 in the soil 3. An electrical double layer Cdl provides capacitance existing in an interface between the metal in the sensor 4 and the soil 3. Resistance components Rs1 and Rs2 are resistance in the soil 3 and other resistance. Capacitance Cs is a capacitance component in the soil 3. Warburg impedance Zw is impedance caused by a diffusion process. Note that in curve fitting, the electrical double layer Cdl and capacitance CS may be substituted with a CPE (Constant Phase Element).

Figure 6:
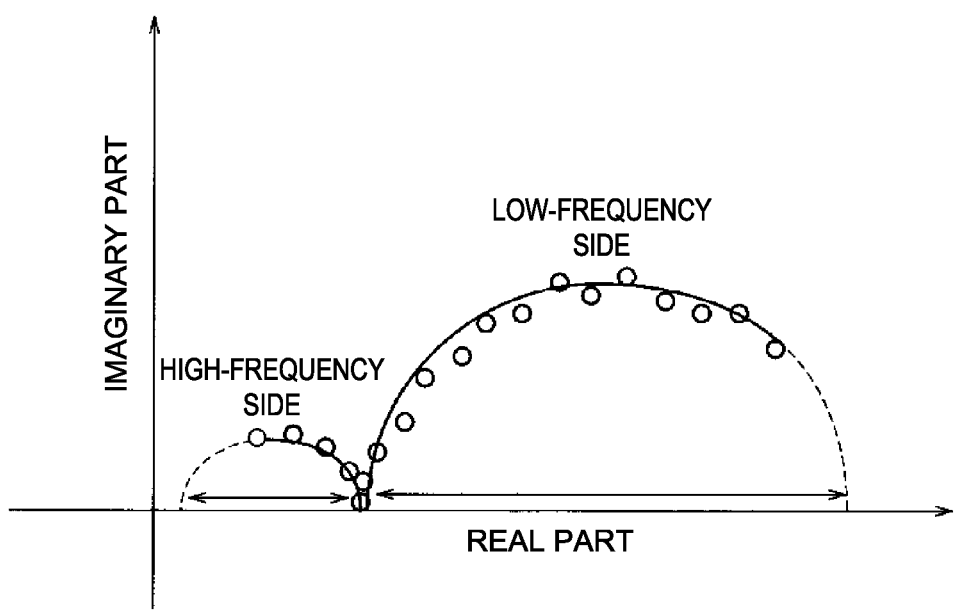
FIG. 6 is a diagram schematically showing a Nyquist diagram.

The equivalent circuits shown in FIGS. 7(a), 7(b), 8(a), and 8(b) theoretically make two circular arcs drawn on a Nyquist diagram as shown in FIG. 6. The circular arc on the high-frequency side originates in the soil 3. The circular arc on the low-frequency side originates in the corrosion reaction.

The charge transfer resistance is given by the width over which the circular arc on the low-frequency side of the Nyquist diagram intersects the abscissa (real part). Note that when AC impedance is measured using two electrodes, the charge transfer resistance is given by half the width.

The corrosion rate is proportional to the inverse of the charge transfer resistance. The proportionality factor K is calculated by deriving a Tafel slope from anodic and cathodic polarization curves (Reference: "Development of Corrosion Rate Monitoring Method (CIPE Method) of Steel in Concrete," Sabi, 2015, No. 148, pp. 2-8).

The use of proportionality factor K allows corrosion current density (corrosion rate) to be calculated from the inverse of the charge transfer resistance. A weight loss rate, volume loss rate, and the like can also be calculated using the corrosion current density.

The corrosion rate measurement unit 10 obtains one corrosion rate from a result of one impedance measurement taken in this way. The corrosion rate measurement unit 10 takes plural impedance measurements in a single water supply cycle. Then, the corrosion rate measurement unit 10 repeats the water supply cycle.

Figure 9:
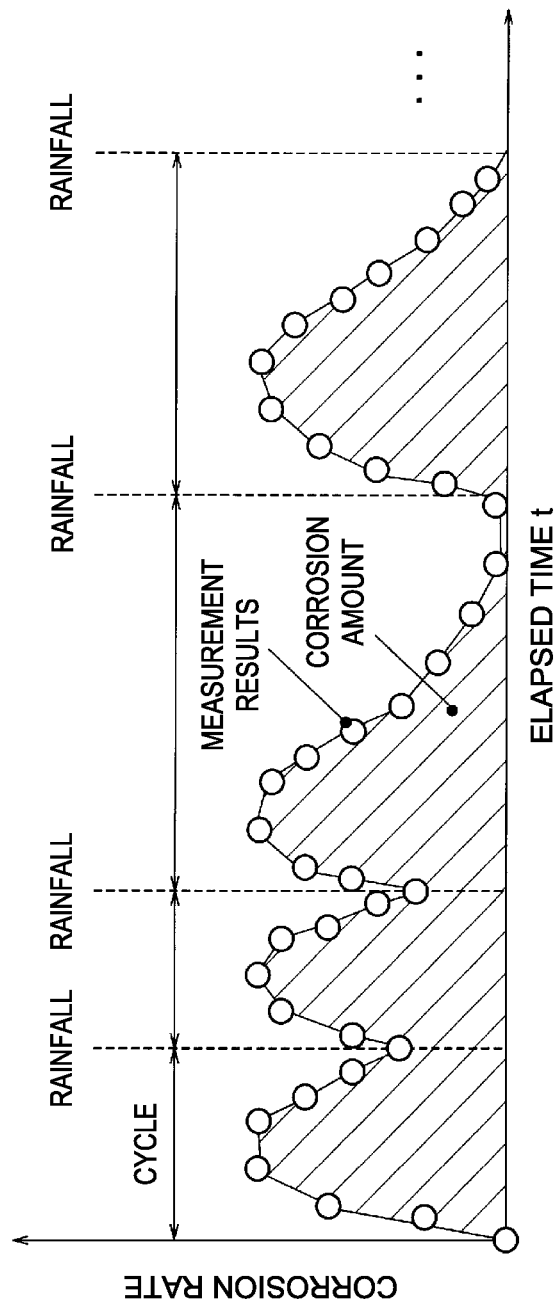
FIG. 9 is a diagram schematically showing an example of corrosion rate measured by a corrosion rate measurement unit of the corrosion rate estimation apparatus shown in FIG. 1.

FIG. 9 is a diagram schematically showing an example of corrosion rate measured by a corrosion rate measurement unit 10. The abscissa in FIG. 8 represents elapsed time and the ordinate represents corrosion rate.

In this way, the corrosion rate measurement unit 10 repeats water supply cycles in which water is supplied to the soil 3 in which the metal to be evaluated is buried and measures a cycle number of each water supply cycle, one or more time points in each cycle, and a corrosion rate (or corrosion rates) of the metal at the time point(s).

(Learning Units)

The learning unit 20 finds a prediction model using as input the cycle number, the time point(s) in the cycle, and the corrosion rate(s) at the time point (s) measured by the corrosion rate measurement unit 10, and using a machine learning algorithm, where the prediction model represents a future corrosion rate.

The prediction model is a model (e.g., a formula) linking information used for prediction to information desired to be predicted. The information desired to be predicted is a corrosion rate. The information used for prediction is information (cycle number, time points in the cycle, and corrosion rates at the time points) measured by the corrosion rate measurement unit 10.

The machine learning method (algorithm) of the learning unit 20 is not specifically restricted. For example, it is conceivable to use an algorithm such as a Random Forests or a decision tree.

As described above, the corrosion rate of metal in soil changes with repetition of cycles beginning with rainfall. The time variation of the corrosion rate in a certain cycle depends on changes in all the preceding cycles. Changes high in so-called auto-correlation are exhibited.

Therefore, for example, the elapsed time t from burial, time variation fn(t) of the corrosion rate in the nth cycle, continuous rainfall duration Wn in the nth cycle, and time interval Tn in the nth cycle can be used as explanatory variables in finding the prediction model. Also, a combination of the above variables may be used as an explanatory variable.

(Corrosion Rate Estimation Unit)

The corrosion rate estimation unit 30 assigns a cycle number and a time point in the cycle at which a corrosion rate is desired to be estimated to the prediction model found by the learning unit 20 and estimates the corrosion rate at the time point.

The information assigned to the prediction model includes information needed for estimation by the use of the prediction model. The information contains, for example, rainfall data in the desired period.

Figure 10:
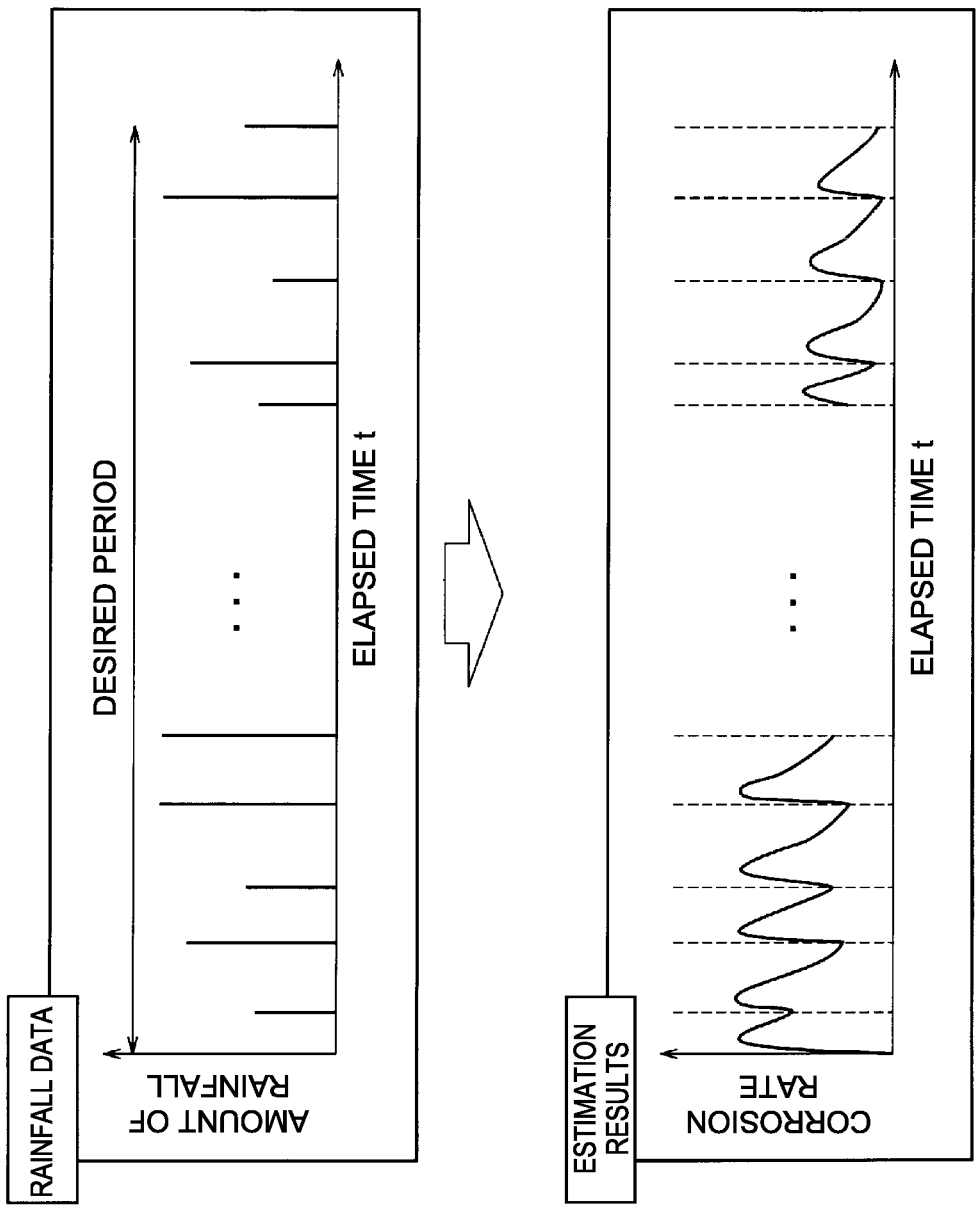
FIG. 10 is a diagram schematically showing rainfall data assigned to a prediction model and an estimated corrosion rate.

FIG. 10 is a diagram schematically showing rainfall data assigned to a prediction model and an estimated corrosion rate. The time variation of corrosion rate can be estimated in this way.

Note that a corrosion amount can also be found easily by finding the time integral of the corrosion rate.

Second Embodiment

Figure 11:
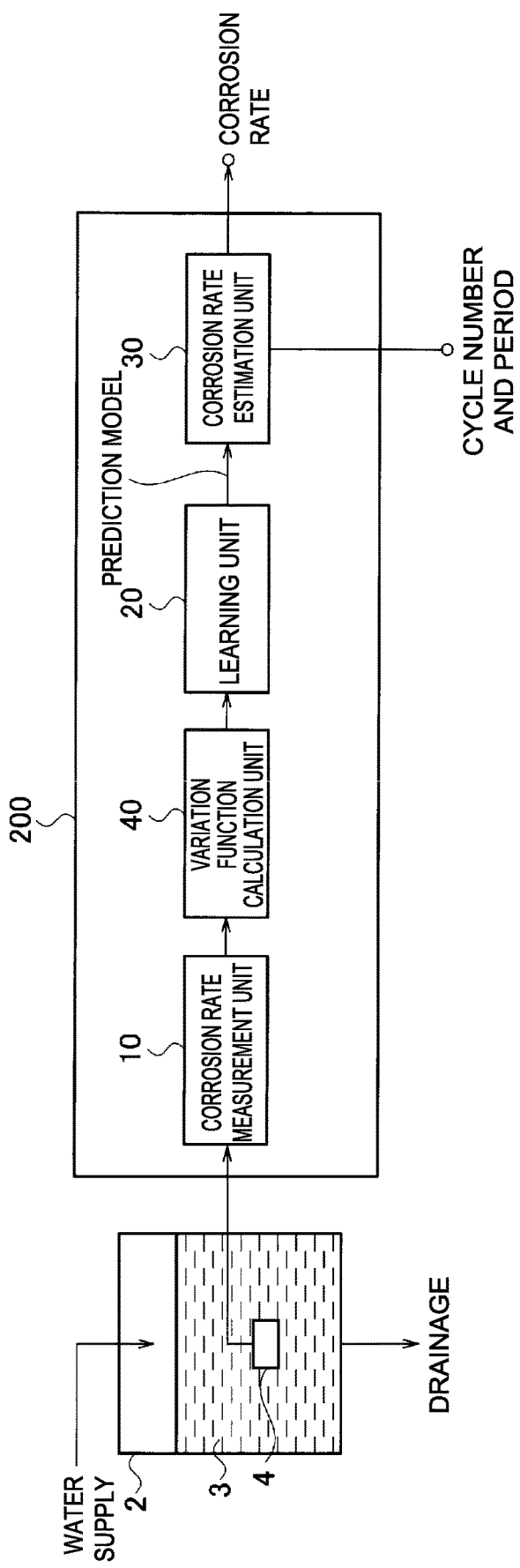
FIG. 11 is a diagram showing a functional configuration example of a corrosion rate estimation apparatus according to a second embodiment of the present invention.

FIG. 11 is a diagram showing a functional configuration example of a corrosion rate estimation apparatus according to a second embodiment of the present invention. The corrosion rate estimation apparatus 200 shown in FIG. 11 differs from the corrosion rate estimation apparatus 100 (FIG. 1) in being equipped with a variation function calculation unit 40.

The variation function calculation unit 40 calculates a variation function that represents changes in plural corrosion rates measured by the corrosion rate measurement unit 10 and gives the variation function to the learning unit 20.

Figure 12:
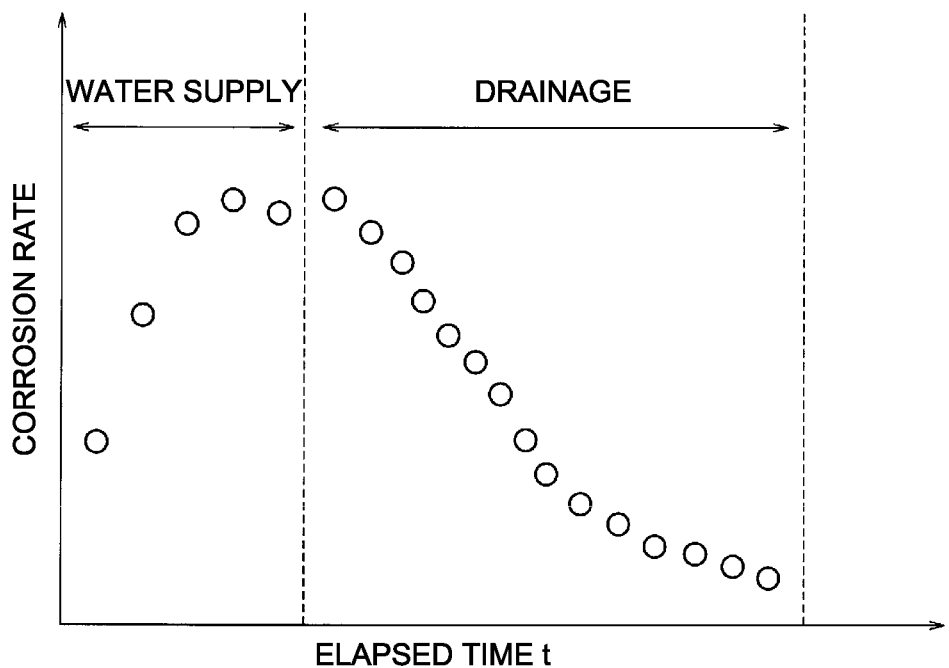
FIG. 12 is a diagram schematically showing changes in corrosion rate.

The variation function calculation unit 40 calculates one or more variation functions from changes in corrosion rate such as shown in FIG. 12. That is, the variation function calculation unit 40 calculates variation functions that represent changes in the corrosion rates with respect to elapsed time.

The variation function is any function V(t) that represent changes in corrosion rate, such as shown in FIG. 12, with respect to elapsed time. The function V(t) is found by curve-fitting any function to changes in corrosion rate such as shown in FIG. 12.

Figure 13:
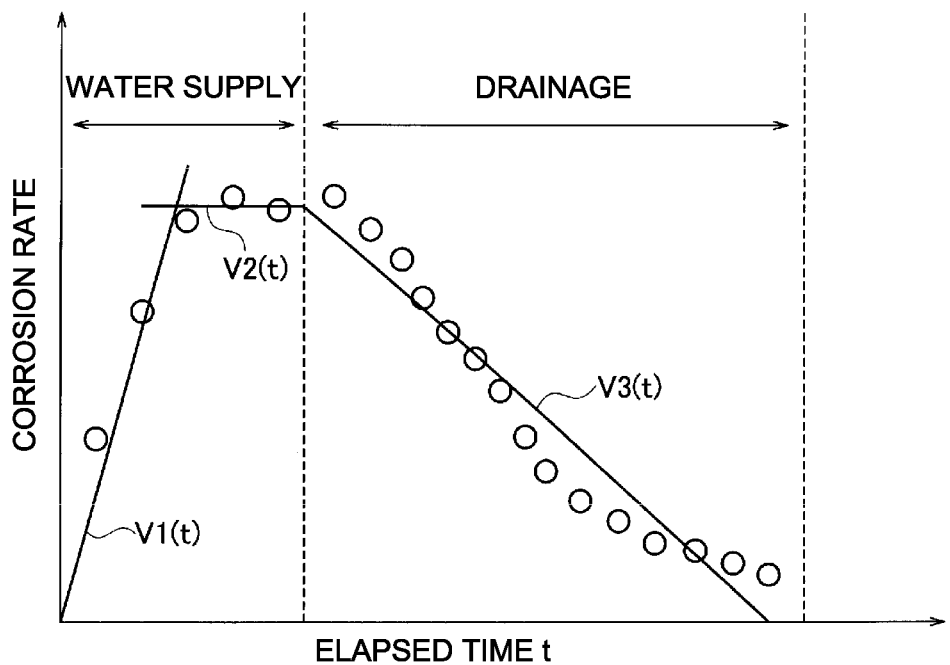
FIG. 13 is a diagram schematically showing an example in which the changes in corrosion rate shown in FIG. 12 are curve-fitted using linear approximation.

FIG. 13 schematically shows an example in which the changes in corrosion rate shown in FIG. 12 are curve-fitted using linear approximation. The corrosion rate increases beginning with the start of water supply, and the function is expressed as $V1(t)=at$ until reaching almost a stable value and the function is expressed as $V2(t)=b$ after reaching a stable value. In a stage in which the corrosion rate decreases after the water supply stops, the function is expressed as $V3(t)=ct$.

Figure 14:
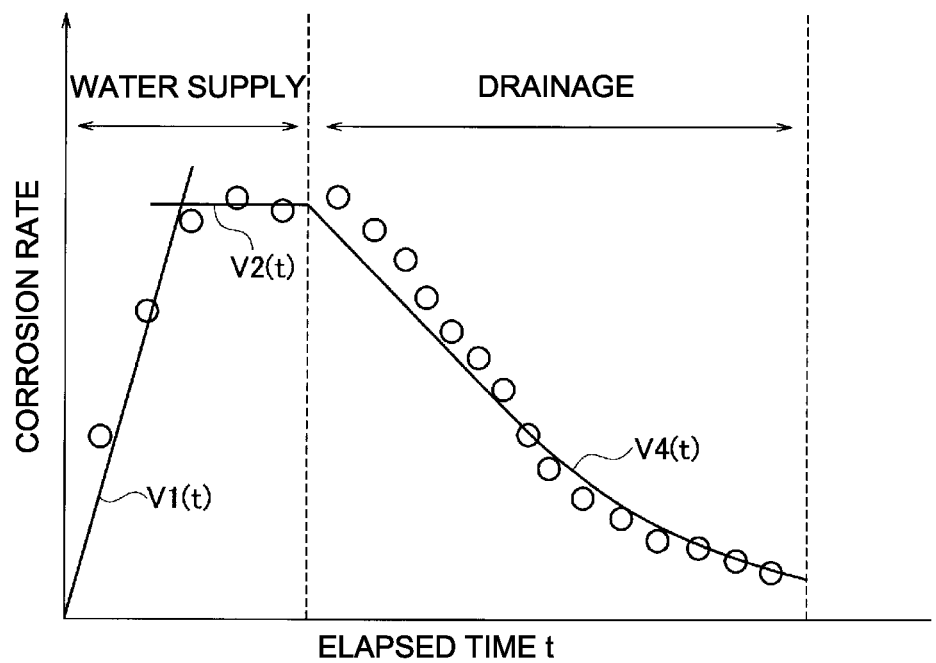
FIG. 14 is a diagram schematically showing an example in which the changes in corrosion rate shown in FIG. 12 are curve-fitted using an exponential function.

Other than a straight line, a quadratic function or an exponential function may be used. FIG. 14 is a diagram in which a function $V4(t)=c \times \exp(dt)+b$ is used instead of V3(t), where a, b, c, and d are constants.

The variation functions found in this way may be input to the learning unit 20. That is, by finding a prediction model of the variation functions, a future corrosion rate may be estimated from the prediction model.

As described above, with the corrosion rate estimation apparatuses 100 and 200 according to the present embodiment, since the time variations of corrosion rates in plural cycles needed in order to estimate a corrosion rate can be acquired at low cost in a short time, a corrosion rate in any future can be predicted easily and simply in a short time.

The present invention is not limited to the embodiments described above, and changes can be made within the scope of the invention. For example, the corrosion rate estimation unit 30 may estimate the corrosion amount by finding the time integral of the corrosion rate.

Note that although Random Forests and decision trees have been cited as an example of algorithms for the learning unit 20, another algorithm may be used. In short, regardless of what information (explanatory variable) is used for prediction, the learning unit 20 may use any algorithm as long as a prediction model that represents a future corrosion rate (objective function) can be estimated.

Thus, needless to say, the present invention includes various embodiments and the like not described herein. Therefore, the technical scope of the present invention is defined only by matters specifying the invention that are set forth in the appropriate scope of claims.

REFERENCE SIGNS LIST 100, 200 Corrosion rate estimation apparatus
2 Container unit
3 Soil
4 Sensor (metal in sensor)
10 Corrosion rate measurement unit
20 Learning unit
30 Corrosion rate estimation unit
40 Variation function calculation unit

The invention claimed is:

1. A corrosion rate estimation apparatus comprising:
a corrosion rate measurement unit adapted to repeat water supply cycles in which water is supplied to soil in which a metal to be evaluated is buried, and to measure a cycle number of each water supply cycle, one or more time points in each water supply cycle, and a corrosion rate of the metal at the one or more time points;
a learning unit adapted to find a prediction model using the cycle number, the one or more time points, and the corrosion rate as input to a machine learning algorithm, the prediction model representing a future corrosion rate; and
a corrosion rate estimation unit adapted to assign a particular cycle number and a time point in a particular cycle at which a desired corrosion rate is to be estimated to the prediction model, and to estimate the desired corrosion rate of the metal at the time point.

2. The corrosion rate estimation apparatus according to claim 1, further comprising a variation function calculation unit adapted to calculate a variation function that represents changes in a plurality of corrosion rates measured by the corrosion rate measurement unit, and to provide the variation function to the learning unit, wherein the learning unit accepts the variation function as input and finds the prediction model representing the future corrosion rate using the machine learning algorithm.

3. A corrosion rate estimation method performed by a corrosion rate estimation apparatus, the corrosion rate estimation method comprising:

repeating water supply cycles in which water is supplied to soil in which metal to be evaluated is buried and measuring a corrosion rate of the metal in each water supply cycle a plurality of times;

finding a prediction model by accepting as inputs to a machine learning algorithm, cycle numbers of the water supply cycles and corrosion rates, the prediction model representing a future corrosion rate; and assigning a cycle number and a time point in a cycle at which a desired corrosion rate is to be estimated to the prediction model, and estimating the desired corrosion rate of the metal at the time point.

* * * * *